United States Patent

Revuelta

Patent Number: 5,542,686
Date of Patent: Aug. 6, 1996

[54] CHUCK JAW MANUFACTURE

[76] Inventor: Jose O. Revuelta, 2038 City View Ave., Los Angeles, Calif. 90033

[21] Appl. No.: 275,682

[22] Filed: Jul. 15, 1994

[51] Int. Cl.⁶ .................................................. B23B 31/16
[52] U.S. Cl. ........................................ 279/153; 279/123
[58] Field of Search ..................................... 279/123, 124, 279/152, 153; 269/261, 262, 271, 279, 280, 282–284

[56] References Cited

U.S. PATENT DOCUMENTS 3,179,430  4/1965  Zierden ................................... 279/123
4,706,973  11/1987  Covarrubias et al. .................. 279/153

Primary Examiner—Steven C. Bishop
Attorney, Agent, or Firm—Frank L. Zugelter

[57] ABSTRACT

A jaw assembly (17) in combination with a master chuck jaw (18) of a chuck (16), the assembly (17) having a base (29) that includes a sleeve insert (48) that is splined (49) to mate with a spline (50) in a bore (44) in the base (29); with an annular chamfer (46) on the bottom of the base (29) to which a flared-out portion (52) of the insert (48) keys. A slug (26) adapted to hold a workpiece (30) includes splines (36) that mount to the splines (49) of the splined insert (48) that extends upwardly of the base (29). Above the splines (36) in the slug's bore (32), an unsplined portion of the bore (32) provides for a shoulder (38) that seats a threaded bolt (40) that threads to internal threads (54) provided in the insert (48), for securing the slug (26) to its base (29).

9 Claims, 2 Drawing Sheets

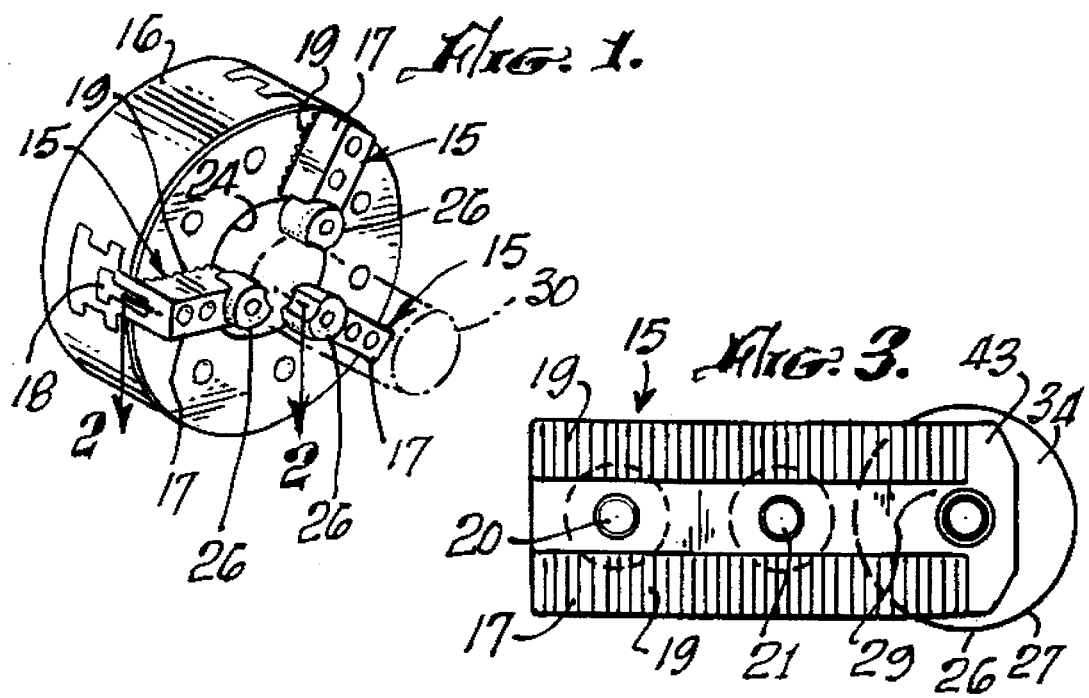
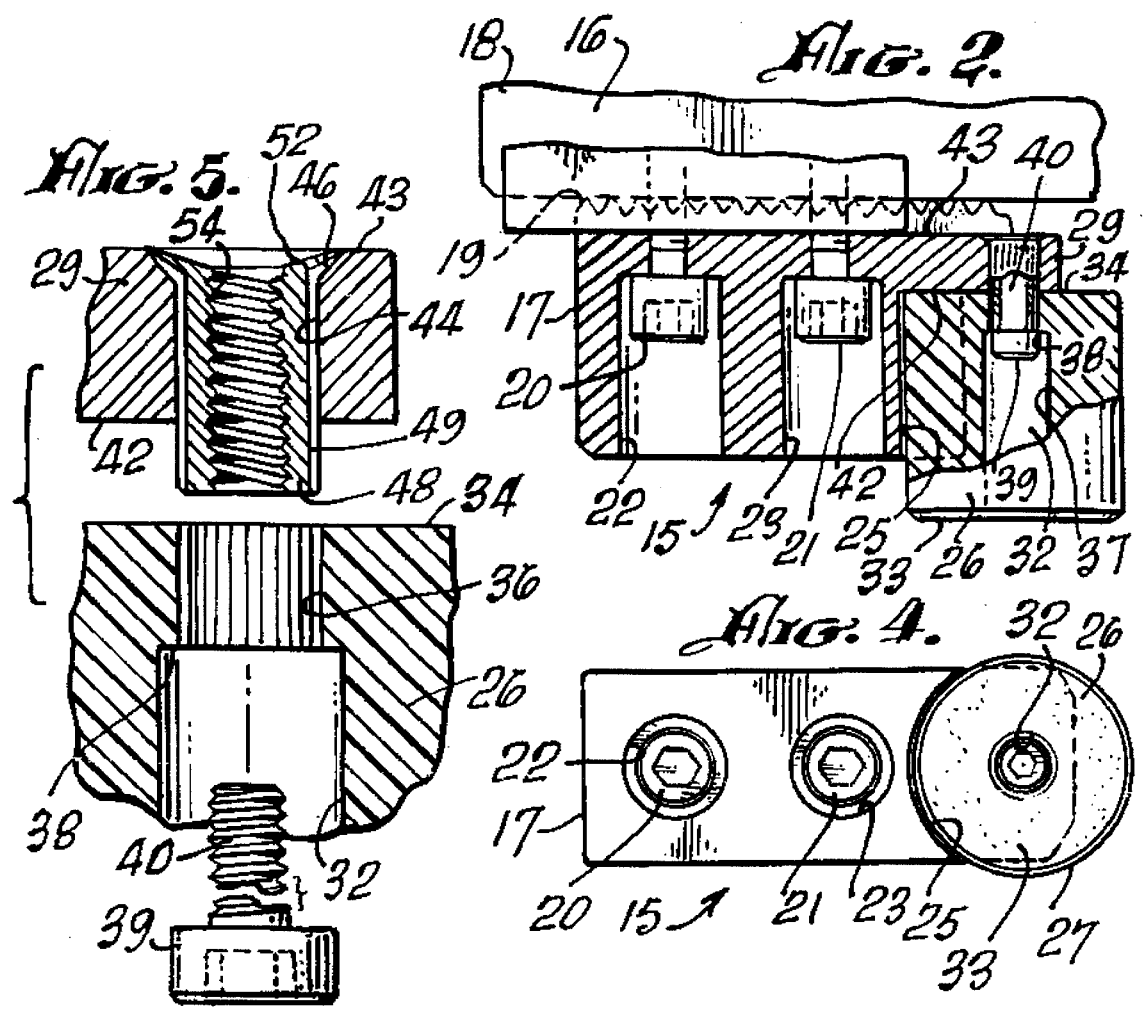

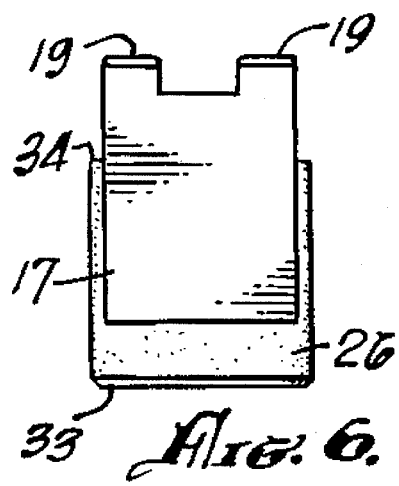
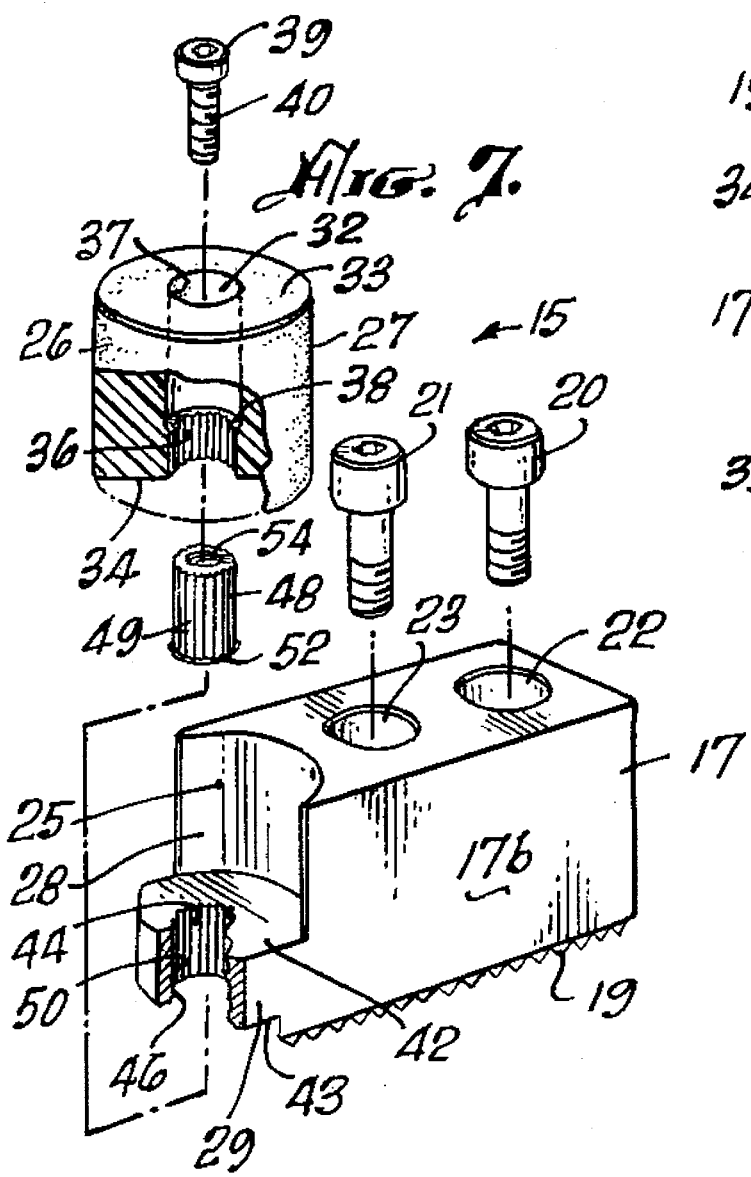
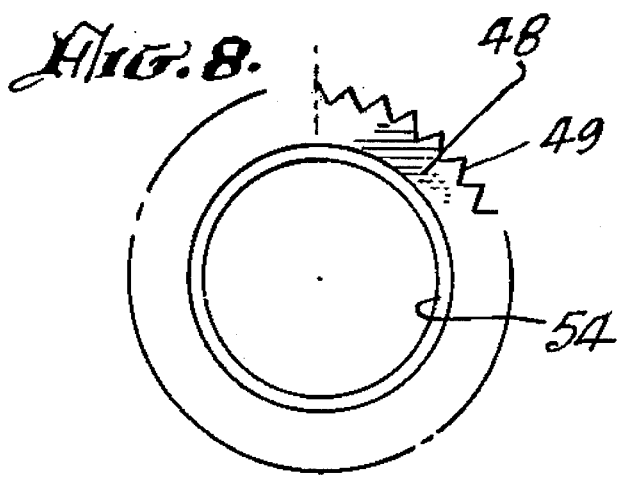

5,542,686

CHUCK JAW MANUFACTURE

TECHNICAL FIELD

This invention is directed to chuck jaws and in particular to a chuck jaw assembly that firmly grips a workpiece.

PROBLEMS IN THE PRIOR ART AND PRIOR ART

The chuck jaw disclosed in U.S. Letters Pat. No. 4,706,973, granted Nov. 17, 1987, to Covarrubias et al, the precursor to this invention, does not disclose nor did it comprehend or embrace the inventive concept of this invention. In practice, that parent's slugs (cylindrical members) that held the workpiece would not set fixedly on the base of the chuck jaw assembly; rather, it would turn. This invention overcomes such problem. Prior art disclosures that may be pertinent to this invention, and hereby made of record, are found in U.S. Letters Pat. Nos. 400,459; 2,757,008; 2,950,117; 3,179,430; 3,190,666; 3,244,430; 3,322,434; 3,459,433; 3,679,221; 3,707,293; 4,488,731; 4,496,165; 4,550,922; and 4,556,228.

SUMMARY OF THE INVENTION

The invention lies in a base of a jaw body and a cylindrical member (slug) fixedly secured thereto, and in their assembly. The base includes a splined bore that is chamfered at its bottom. A splined insert having a flared-out annular rim or end that mates with the splined bore's chamfer is securely mounted in this bore of the base. The splined insert includes a threaded bore throughout its length such length extending above the base. Each slug has a bore a portion of which includes a splined body formation that mates with the exposed splines of the insert above the base. An unsplined portion remains in each slug's bore to form a shoulder for seating the head of a threaded bolt that threads to the threaded spline insert. The slug is held securely fixed to the jaw body by such bolt, during operation of the subject matter of the invention on a workpiece, the flaring out of the insert against the base's chamfer preventing the insert from being pulled out by reason of the bolt being tightened or snugged up.

An object of this invention is a novel chuck jaw assembly and in its components or elements.

Another object of the invention is to securely fix a slug on the base of its jaw body in the assembly of jaw and slug.

Another object of this invention is to provide a lightweight and inexpensive slug.

Still another object of this invention is to provide a novel combination of a master chuck jaw with a jaw assembly.

These and other objects and advantages of the invention will become more fully apparent by a reading of the following description, the appended claims thereto, and the accompanying drawing comprising two (2) sheets of eight (8) FIGURES.

BRIEF DESCRIPTION OF THE DRAWING

FIG. 1 is a perspective view of an embodiment of the invention mounted on a chuck.

FIG. 2 is a view taken on line 2—2 of FIG. 1

FIG. 3 is a bottom view of a jaw assembly incorporating the invention.

FIG. 4 is a top view of the jaw assembly incorporating the invention.

FIG. 5 is an enlarged, exploded, sectional fragmentary view of the novel jaw assembly.

FIG. 6 is a rear view of FIG. 2.

FIG. 7 is an exploded perspective view of the novel jaw assembly, partially broken away, incorporating the invention.

FIG. 8 is a plan view of a spline insert of this invention.

BEST MODE OF CARRYING OUT THE INVENTION

Referring now to the drawing wherein reference characters correspond to numerals hereinafter, FIGS. 5 and 7 illustrate the subject matter 15 of the present invention. FIG. 1 illustrates a plurality, usually three (3) in number, of assemblies of such subject matter to a conventional chuck 16. Each jaw assembly 17, FIG. 2, is mounted to a serrated master jaw 18, FIG. 2, by its bottom serrations 19 corresponding to the master jaw's setrations 20, the master jaw 18 in turn in conventional fashion being mounted to the chuck 16. The jaw assembly 17 is secured to the master jaw 18 by means of a pair of securing bolts 20, 21 when seated in their corresponding bores 22, 23 in a conventional manner, FIG. 2. The longitudinal axis of each jaw assembly 17 aligns radially to the central axis (not shown) of the chuck's bore 24, FIG. 1, in a conventional manner. Actuation of the master jaws 18, in known manner, of the plurality of jaw assemblies 17 advances and retracts them radially inwardly towards or outwardly from such axis, in operation, the tightening of the assemblies bolts 20, 21 to their corresponding master jaws 18 having first been accomplished.

Included in the body 17b, FIG. 7, of each jaw assembly 17, there is a cut-out portion 25, cylindrical in nature, to accommodate a cylindrical member or slug 26 having a peripheral circular wall 27 that matches the cylindricalness of the body or wall formation 28 of cut-out portion 25. Each slug 26 is mounted upon an integrally formed base 29 extending from the body 17b towards the axis of the chuck's bore 24, the slug 26 being adapted to be arcuately cut by known techniques, not a part of this invention, so as to support and tightly hold a cylindrical workpiece 30 (shown in phantom in FIG. 1) that includes a periphery that corresponds to the arcuate cut (FIG. 1) in the slug 26 and on which work is to be performed during rotation of the chuck 16.

Each slug 26 includes a concentric bore 32 between its two upper and lower terminal ends 33, 34 that define its peripheral wall 27. Contiguous to or adjacent the lower end 34, a portion of the body formation of the bore 32 is splined as at 36, while the unsplined portion 37 of the bore 32 above the splines 36 remains to provide for a contiguous shoulder 38 to the splines 36 and which extends radially outwardly towards the peripheral wall 27, and on which shoulder 28 is seated the head 39 of a securing threaded bolt 40 in the assembly of the subject matter 15 of this invention.

The base 29 includes a top surface 42 to which the lower end 34 of the slug 26 mounts in such assembly, and further comprises a bottom surface 43, FIG. 2. and a splined bore 44 extending between its top and bottom surfaces 42, 43. The splined bore 44 is annularly chamfered as at 46 FIG. 5 at the bottom surface 43. A sleeved insert 48 having externally mounted splines 49 is mounted in the splined bore 44, having its splines 49 mating by engagement with splines 50 of the splined bore 44 in the base 29. Splined insert 48 includes a flared-out portion 52 that mates by engagement with the chamfer 46 in the assembly of these two elements 29 and 48. Splined insert 48 continues in its length to extend above the top surface 42 of the base 29 extending sufficiently in length so that the splines 36 of its corresponding slug 26 mates by engagement therewith in the mounting of the slug 26 to the base 29. Splined insert 48 includes an internally threaded concentric bore 54 the threads of which match the threads of its corresponding bolt 40 that secures the slug 26 to the base 29.

In practice of the invention, each slug 26 (already arcuately cut to mate with the periphery of the workpiece 30) is mounted on its corresponding base 29 of its corresponding jaw body 17b. The splines 36, 49, and 50 are already fabricated into their corresponding elements, i.e., into the body formation of the bore 32 of slug 26, insert 48, and the body formation of the bore 44 of base 29, respectively, so that when slug 26 is mounted to its base 29 on its jaw body 17b, its splines 36 mate by engagement with the splines 49 on the extended length of the corresponding splined insert 48 already assembled to the splines 50 in the bore 44 of its base 29. Thereafter, a bolt 40 is inserted into the bore 32 of the slug 26 and threaded to the threads 54 of the internally threaded splined insert 48, ready for securing the slug in its place upon base 29. The subsequent snugging up or tightening of bolt 40 to base 29 makes effective the engaged splines of bore 32 with splines 49, while the chamfered and flared out portions 46, 52, respectively, prevent the turning of slug about base. The final securement of slug to base by bolt 40 [the snugging up of bolt 40 to base 29] is accomplished after workpiece 30 has been properly mounted in the bore 24 of chuck 16, and the arcuately cut-out portion 25 of the slug engages the periphery of the workpiece 30. Only then is the bolt 40 securely tightened.

The jaw with its base 29 is fabricated in known fashion; the base's hole is drilled and broached to subsequently fit to its corresponding splined insert. This hole is counterbored so that the annular chamfer 46 is formed for fitting the flared out portion of the insert. The insert 48 is formed from a blank that is drilled, threaded, cut, serrated or splined, and then "coined" to form its flared out portion or rim. The splined insert then is installed in the splined chamfered hole in the base. The slug's bore and its splined portion are similarly formed, in accordance with known processes and techniques. Bolts 20, 21 and 40 are of standard types.

Each slug 26 is preferably formed of aluminum., as is its jaw body 17b, to form the jaw assembly 17. Insert 48 preferably is steel that has been cold rolled and tempered. Bolts 21, 22, and 40 are formed from suitable metal and known in the machine tool industry.

The invention is not to be limited to the exact arrangement of parts or elements shown in the accompanying drawing or described in this specification, as various changes and modifications in the details of construction may be resorted to without departing from the spirit or scope of the invention. For example, the invention is not limited to a particular number of splines on their elements, in each manufacture. The splined portion in the slug need not be contiguous to its bottom end. Therefore, only insofar as the invention has particularly been pointed out in the accompanying claims is the same to be limited.

INDUSTRIAL APPLICABILITY

This invention is useful in the machine tool arts.

I claim:

1. A jaw assembly comprising
   a splined sleeve insert mounted in a body formation forming a splined bore in a base of a jaw body for a chuck, the splined sleeve insert and splined bore mating with each other, the jaw body including a cut-out portion above the base for receiving a slug, the bottom of the splined bore having a chamfer, said insert including a flared-out portion at one end mating with the chamfer, the splined insert extending above the base and including a threaded internal bore, and
   a slug mounted in the cut-out portion and on said base and having a body formation forming a bore, the slug's bore including a splined portion and an unsplined portion that forms a shoulder to the splined portion,
   said splined portion mounted to the splined sleeve insert.

2. The jaw assembly of claim 1 including
   a threaded bolt mounted to the shoulder and threaded to the sleeve insert thereby securely fixing the slug to the base.

3. An improvement in a base of a jaw body for a chuck, the base having a top and a bottom, the improvement comprising
   a splined sleeve insert having ends and an internally threaded bore,
   a splined bore in the base,
   said splined sleeve insert mating with said splined bore, the splined insert extending above the top of the base.

4. The improvement of claim 3 wherein
   the splined bore of the base includes a chamfer at its bottom, and
   the splined insert includes a flared-out portion at one of its ends that mates with the chamfer.

5. A slug comprising
   a cylindrical member having a body formation forming a bore extending between a top and a bottom of the member,
   said bore including
      a splined portion in the bore's body formation adjacent the bottom of the member, and
      an unsplined portion in the bore's body formation above the splined portion thereby forming a contiguous shoulder extending radially outwardly of said splined portion to the unsplined portion.

6. The slug of claim 5 wherein said bore is a concentric bore.

7. In combination with a master chuck jaw,
   an improved chuck jaw assembly mounted to said master chuck jaw and comprising
   a splined sleeve insert mounted in a body formation forming a splined bore in a base of the body of a jaw in said assembly, the splined sleeve insert and splined bore mating with each other, the chuck jaw including a cut-out portion above the base for receiving a slug, the bottom of the splined bore having a chamfer, said insert including a flared-out portion at one end mating with the chamfer, the splined insert extending above the base and including a threaded internal bore, and
   a slug mounted in the cut-out portion and on said base and having a body formation forming a bore, the slug's bore including a splined portion and an unsplined portion that forms a shoulder to the splined portion, said splined portion mounted to the splined sleeve insert.

8. In the combination of claim 7,
   said shoulder being contiguous to said splined portion and extending radially outwardly of said splined portion.

9. In the combination of claim 8, the slug having a concentric bore.

* * * * *